United States Patent
Mukira et al.

(10) Patent No.: US 6,468,367 B1
(45) Date of Patent: *Oct. 22, 2002

(54) SUPERALLOY WELD COMPOSITION AND REPAIRED TURBINE ENGINE COMPONENT

(75) Inventors: Charles Gitahi Mukira, Clifton Park, NY (US); Melvin Robert Jackson, Niskayuna, NY (US); Jon Conrad Schaeffer, Simpsonville, SC (US); William Scott Walston, Mason, OH (US); Thomas Froats Broderick, Springboro, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/472,917

(22) Filed: Dec. 27, 1999

(51) Int. Cl.[7] .............................................. C22C 19/05
(52) U.S. Cl. ....................................... 148/428; 420/445
(58) Field of Search ........................... 148/428; 420/445, 420/448

(56) References Cited

U.S. PATENT DOCUMENTS

| | | | | |
|---|---|---|---|---|
| RE29,920 E | * | 2/1979 | Baldwin ....................... | 420/445 |
| 4,292,076 A | * | 9/1981 | Gigliotti et al. ................. | 75/170 |
| 4,719,080 A | * | 1/1988 | Duhl et al. .................... | 420/443 |
| 4,764,225 A | * | 8/1988 | Shankar et al. ............... | 148/404 |
| 5,035,958 A | * | 7/1991 | Jackson et al. ............... | 428/553 |
| 5,043,138 A | * | 8/1991 | Darolia et al. ................. | 420/443 |
| 5,192,625 A | * | 3/1993 | Fishman ....................... | 428/668 |
| 5,240,491 A | * | 8/1993 | Budinger et al. .............. | 75/255 |
| 5,316,866 A | * | 5/1994 | Goldman et al. ............. | 428/621 |
| 5,395,584 A | * | 3/1995 | Berger et al. ................. | 420/443 |
| 5,482,789 A | * | 1/1996 | O'Hara et al. ............... | 428/652 |
| 5,584,663 A | * | 12/1996 | Schell et al. ............. | 416/241 R |
| 5,783,318 A | * | 7/1998 | Biondo et al. ............... | 428/680 |
| 5,897,801 A | * | 4/1999 | Smashey et al. ..... | 219/137 WM |

FOREIGN PATENT DOCUMENTS

| | | |
|---|---|---|
| EP | 0 962542 A1 | * 12/1999 |
| EP | 1 054072 A1 | * 11/2000 |

OTHER PUBLICATIONS

ASM Handbook, vol. 2:Properties and Selection:Nonferrous Alloys and Special–Purpose Materials, 1992, pub. by ASM International, p. 444–445.*

* cited by examiner

*Primary Examiner*—Roy King
*Assistant Examiner*—Harry D Wilkins, III
(74) *Attorney, Agent, or Firm*—Robert P. Santandrea; Noreen C. Johnson

(57) ABSTRACT

A superalloy weld composition, includes:
  about 2 to about 5 wt % Co;
  about 5 to about 15 wt % Cr;
  about 7 to about 10 wt % Al;
  about 4 to about 6 wt % Ta;
  about 0.5 to about 1.5 wt % Si;
  about 0.1 to about 0.5 wt % Hf;
  up to about 0.05 wt % C;
  up to about 0.05 wt % B;
  about 1.0 to about 2.0 Re;
  about 3 to about 4.5 wt % W; and
  balance Ni.

11 Claims, 3 Drawing Sheets

SUPERALLOY WELD COMPOSITION AND REPAIRED TURBINE ENGINE COMPONENT

BACKGROUND OF THE INVENTION

The present invention is drawn to the field of turbine engine components. More particularly, the present invention is drawn to a superalloy weld composition and a repaired component utilizing a superalloy weld composition.

The efficiency of gas turbine engines is dependent in part on the amount or degree of leakage of combustion gases between the turbine blades or buckets and the shroud of the turbine section of the engine. To minimize the gap, the tips are generally subjected to a precise machining operation. However, due to machining tolerances, thermal expansion differences between the components, and dynamic effects, typically some degree of rubbing between the tips and the shroud occurs.

Due to the rubbing contact, such as after extended service in the field, the base material of the blade is exposed, generally leading to corrosion and/or oxidation of the blade. Extended corrosion or oxidation leads to an increase in leakage between the blade and the shroud and consequent performance and efficiency losses. It has become commonplace to repair worn components as a cost-effective option to replacement, in view of the relative cost of turbine components such as blades or buckets. In a known repair technique, a weld wire formed of a weldable superalloy composition is used in a 'build-up' process to restore the blade to its original or near-original geometric configuration. For example, a nickel-base superalloy weld wire can be used in a tungsten arc welding process by making multiple passes over the tip region of a nickel-base superalloy blade. Following welding, the tip region is machined.

While there are numerous commercially available weld repair alloys, there continues to be a demand for further improved weld alloys, particularly, nickel-base weld alloys for nickel-base superalloy components. In this regard, the present inventors have recognized a need for a nickel-base superalloy that has improved oxidation resistance over state of the art repair alloys, and requisite high-temperature tensile strength and creep resistance. It is also desired to provide an alloy that has compositional uniformity to enable formation into a wire, and which has room temperature weldability (ductility).

BRIEF SUMMARY OF THE INVENTION

One embodiment of the present invention calls a superalloy weld composition, including:
  about 2 to about 5 wt % Co;
  about 5 to about 15 wt % Cr;
  about 7 to about 10 wt % Al;
  about 4 to about 6 wt % Ta;
  about 0.5 to about 1.5 wt % Si;
  about 0.1 to about 0.5 wt % Hf;
  up to about 0.05 wt % C.
  up to about 0.05 wt % B;
  about 1.0 to about 2.0 Re;
  about 3 to about 4.5 wt % W; and
  balance Ni.

Another embodiment of the present invention is drawn to a repaired turbine engine component having a repaired region and an in-tact region. The repaired region has a composition as provided above.

DETAILED DESCRIPTION OF THE INVENTION

Embodiments of the present invention provide a repaired turbine engine component and a weld composition for repairing turbine engine components. The turbine engine component is typically formed of a superalloy material, known for high temperature performance in terms of tensile strength, creep resistance, oxidation resistance, and corrosion resistance, for example. The superalloy component is typically formed of a nickel-base alloy, wherein nickel is the single greatest element in the superalloy by weight. Illustrative nickel-base superalloys include at least about 40 wt % Ni, and at least one component from the group consisting of cobalt, chromium, aluminum, tungsten, molybdenum, titanium, and iron. Examples of nickel-base superalloys are designated by the trade names Inconel®, Nimonic®, Rene® (e.g., Rene®80–, Rene®95, Rene®142, and Rene®N5 alloys), and Udimet®, and include directionally solidified and single crystal superalloys.

The form of the turbine engine component varies among combustor liners, combustor domes, shrouds, buckets or blades, nozzles or vanes. The component is most typically an airfoil, including stationary airfoils such as nozzles or vanes, and rotating airfoils including blades and buckets. Blades and buckets are used herein interchangeably; typically a blade is a rotating airfoil of an aircraft turbine engine, and a bucket is a rotating airfoil of a land-based power generation turbine engine. In the case of a blade or bucket, typically the region under repair is the tip region that is subject to wear due to rubbing contact with a surrounding shroud, and to oxidation in the high-temperature environment. In the case of a nozzle or vane, typically the area under repair is the leading edge which is subject to wear due to exposure of the highest velocity gases in the engine at elevated temperature. The repair weld composition may be used alone, as a filler material, or in combination with an insert, such as a contoured plate that is welded in place along the leading edge of a nozzle or vane.

Figure 1:
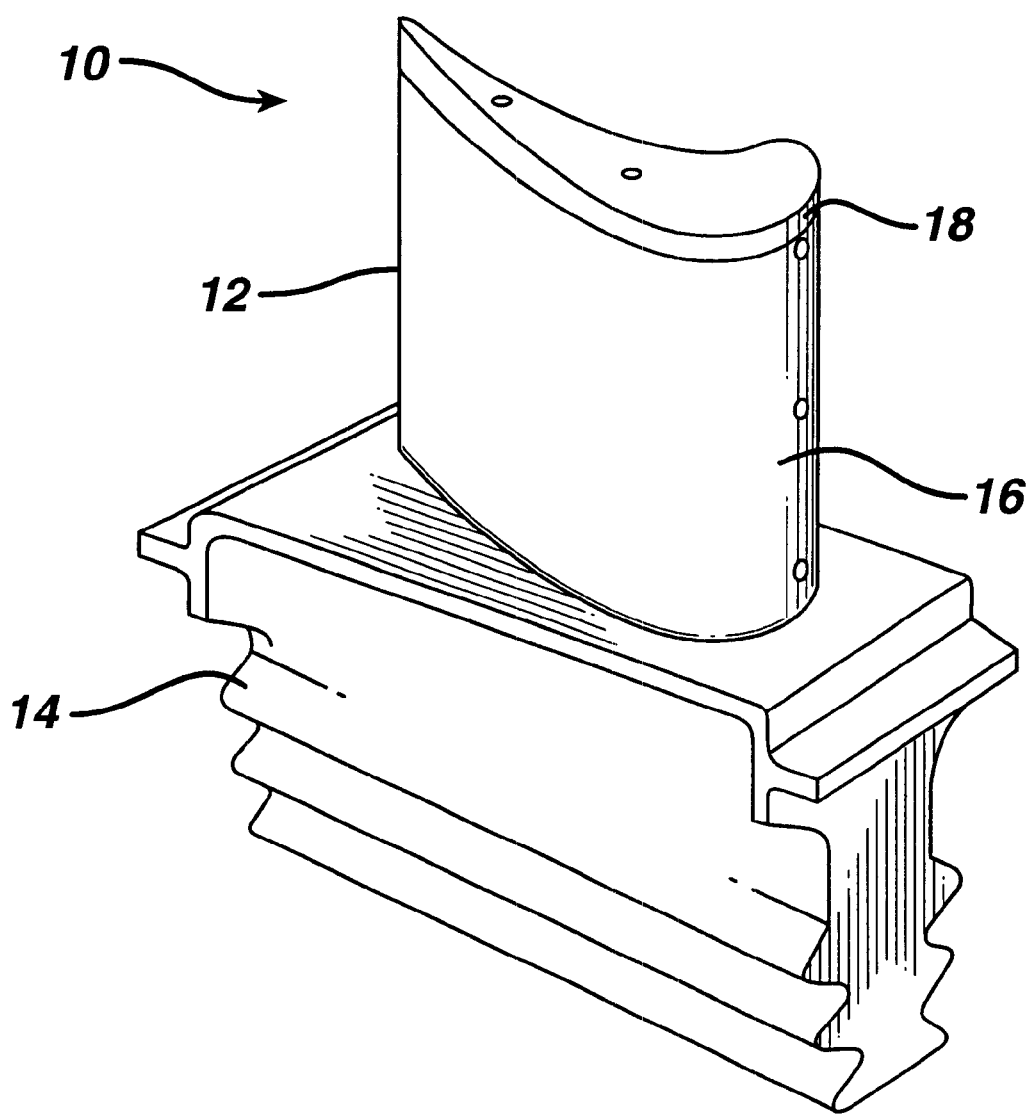
FIG. 1 is an elevated perspective view of a repaired turbine bucket of a high-pressure stage of a turbine engine.

Turning to FIG. 1, a repaired airfoil, particularly, a repaired blade or bucket 10 of a jet engine or power generation turbine engine is illustrated. The bucket 10 includes an airfoil portion 12 and dovetail portion 14. The airfoil portion 12 has an intact region 16, and a repaired region 18. Prior to repair, the bucket is removed from the turbine engine, and cleaned by a conventional process to remove deposited foreign materials as well as any oxidation and corrosion. The cleaned coating is removed from the region near the tip, and the tip is ground back to near the tip cavity and is then repaired by a welding technique. Typically tungsten arc inert gas (TIG) welding is used although other welding techniques may be employed such as gas-metal arc welding, resistance welding, electron beam welding, plasma welding, and laser welding. In the TIG welding process, heat is produced between the workpiece, e.g., the tip of bucket 10, and the tungsten electrode. A nickel-base weld wire having a composition as described herein is used as a filler metal. Multiple passes are made around the periphery of the tip thereby building up the tip to approximate the original geometry. The repair may be accomplished with heat input only from the weld process, or the part may be additionally heated in the region being repaired. The repair process is completed by additional machining, as well as any coating processes (e.g., overlay coatings, diffusion coatings, thermal barrier coatings) for further protection of the blade or bucket.

According to an embodiment of the present, invention, a weld alloy composition includes about 2 to about 5 wt % Co; about 5 to about 15 wt % Cr; about 7 to about 10 wt % Al; about 4 to about 6 wt % Ta; about 0.5 to about 1.5 wt % Si; about 0.1 to about 0.5 wt % Hf; up to about 0.05 wt % C; up to about 0.05 wt % B; about 1.0 to about 2.0 Re; about 3 to about 4.5 wt % W; and balance Ni. Preferably, the composition contains about 3 to about 3.5 wt % Co; about 7 to about 9 wt % Al; up to about 0.03 wt % C; and up to about 0.03 wt % B.

In one embodiment, the composition includes about 7 to about 8 wt % Cr, and further, about 0.5 to about 0.65 wt % Si, about 0.1 to about 0.2 wt % Hf. A typical composition is provided in the Table, composition D, which is substantially free of Ti.

In an alternative embodiment, the composition Ti is present, such as in an amount of about 0.6 to 0.8 wt %. Typical compositions are shown in the Table, particularly, compositions A–C. Compositions D–I differ from A–C generally by having a reduced amount of melting point suppressants, such as Si, Ti, Hf, and Al.

Several embodiments contain Ru, such as in an amount of about 3 to 8 wt %.

Weld alloys according to embodiments of the present invention were cast and directionally solidified (DS) into rectangular ingots having the dimensions 15 cm×3 cm×1 cm. From each of the ingots, oxidation pins, compact rupture (tensile) specimens, and weld wires were formed by electro-discharge machining (EDM). While the particular form of the alloy body differed depending on the testing technique under investigation, embodiments of the present invention typically take the form of a weld wire in practical use. In this regard, the uniformity of compositions of embodiments of the present invention is controllable to enable wire formation.

Figure 2:
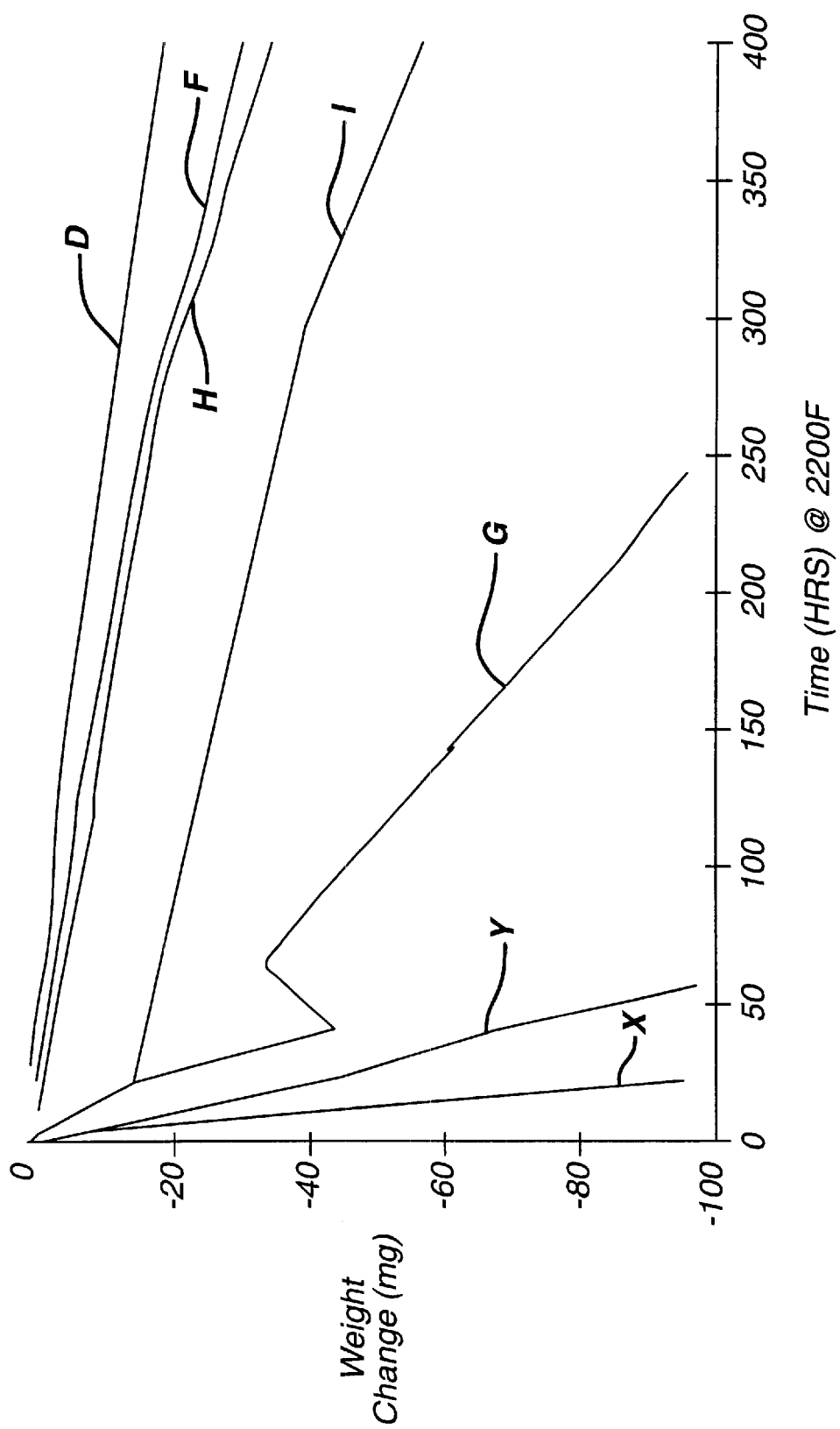
FIG. 2 is a plot representing cyclical oxidation of several alloy compositions of the present invention and two commercially available alloys, at 2200° F.
Figure 3:
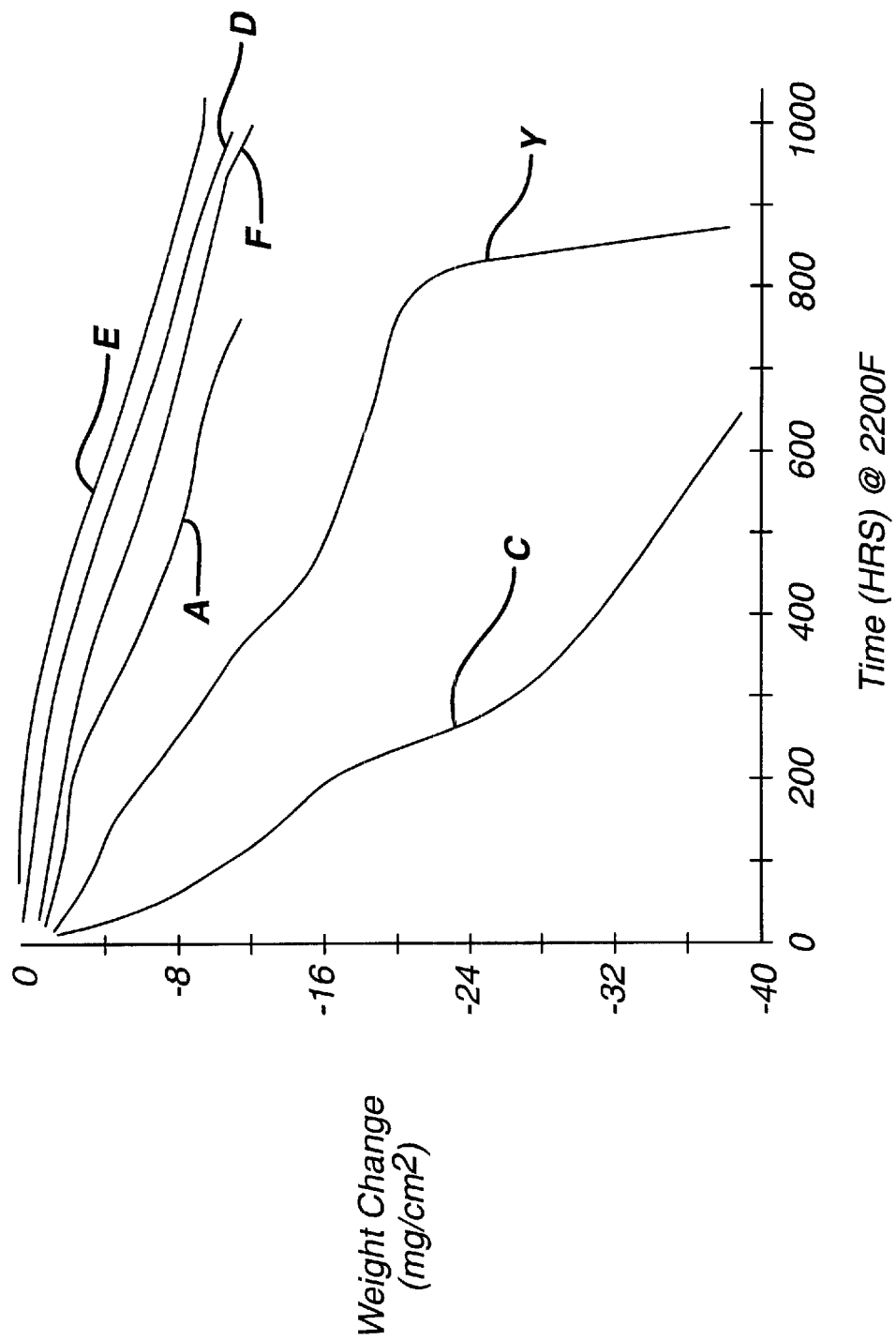
FIG. 3 is a plot representing isothermal oxidation of several alloy compositions of the present invention and a commercially available alloy, at 2200° F.

Turning to FIGS. 2 and 3, the results are shown for oxidation resistance for selected compositions. FIG. 2 illustrates the results of cyclic oxidation. Oxidation pins were loaded into a burner rig test (Becon Test), and for each cycle, were heated to 2200° F. for 30 seconds, and held at 2200° F. for 2.5 minutes, and force air cooled for 2 minutes. The test specimens were weighed once/day. The y-axis, weight change, represents the extent of oxidation. As shown by the plots, alloys according to embodiments of the present invention showed superior resistance to oxidation as compared to the commercially available alloys X and Y, which indicates that alloy compositions according to embodiments of the present invention have longer service lives than state of the art alloys X and Y.

FIG. 3 illustrates the results of isothermal oxidation. Oxidation pins were held at 2200° F. for 1000 hours, and the test specimens were weighed once/day. The y-axis, weight change, represents the extent of oxidation. As clearly shown by the plots, alloys according to embodiments of the present invention showed clearly superior resistance to oxidation as compared to the commercially available alloys Y, which indicates that alloy compositions according to embodiments of the present invention have longer service lives than state of the art alloy Y.

The high-temperature tensile strength of directionally solidified examples was also tested. Alloy compositions A, C, D, E, F. demonstrated tensile strength at 2200° F. on par with or above state of the art alloys X and Y. Room temperature yield strength and ultimate tensile strength of compositions D through I were superior to alloy Y.

The weld alloys were also tested to evaluate rupture lives of directionally solidified specimens. Directional solidification was carried out for some alloys to eliminate the effect of differing grain structures of the specimens. Compositions according to embodiments of the present invention demonstrated sufficient rupture lives for practical use.

Room temperature weldability was examined by bead-on-plate TIG welding on nickel-base superalloy plates of alloy compositions D–I. A fluorescent die penetrant and X-ray analysis techniques were used to check for cracks. None of the alloys showed post-weld cracking, and post-heat cracking was nominal, indicating that the alloy compositions are room temperature weldable. In this regard, it is noted that the alloys have been found to have a gamma/gamma prime matrix microstructure, having an interdendritic beta phase.

According to embodiments of the present invention, alloy compositions have been provided that have requisite room temperature weldability, high temperature strength, high temperature creep rupture properties, and high temperature oxidation resistance. While embodiments of the present invention have been described herein with particularity, it is understood that those of ordinary skill in the art may make modifications thereto and still fall within the scope of the appended claims.

TABLE

| SAMPLE | Ni | Cr | Co | Al | Ta | Si | Hf | C | B | Re | Ti | W | Other |
|---|---|---|---|---|---|---|---|---|---|---|---|---|---|
| A | 68.52 | 7.47 | 3.17 | 8.72 | 5.52 | 0.91 | 0.32 | 0.02 | 0.02 | 1.34 | 0.69 | 3.30 | |
| B | 65.60 | 10.31 | 3.19 | 8.75 | 5.54 | 0.91 | 0.32 | 0.02 | 0.02 | 1.34 | 0.69 | 3.31 | |
| C | 65.38 | 3.13 | 3.13 | 8.59 | 5.44 | 0.89 | 0.32 | 0.02 | 0.02 | 1.32 | 0.68 | 3.25 | 3.60 Ru |
| D | 69.38 | 7.8 | 3.12 | 7.97 | 5.43 | 0.59 | 0.16 | 0.01 | 0.01 | 1.64 | 0 | 3.89 | |
| E | 66.31 | 7.58 | 3.07 | 7.85 | 5.34 | 0.59 | 0.16 | 0.01 | 0.01 | 1.62 | 0 | 3.83 | 3.53 Ru |
| F | 63.32 | 7.57 | 3.03 | 7.74 | 5.26 | 0.58 | 0.15 | 0.01 | 0.01 | 1.59 | 0 | 3.78 | 6.96 Ru |
| G | 66.51 | 10.58 | 3.13 | 8 | 5.44 | 0.6 | 0.16 | 0.01 | 0.01 | 1.65 | 0 | 3.91 | |
| H | 63.46 | 10.43 | 3.08 | 7.88 | 5.36 | 0.59 | 0.16 | 0.01 | 0.01 | 1.62 | 0 | 3.85 | 3.55 Ru |
| I | 60.51 | 10.27 | 3.04 | 7.76 | 5.29 | 0.58 | 0.15 | 0.01 | 0.01 | 1.6 | 0 | 3.79 | 6.99 Ru |
| X | 58.45 | 6.80 | 11.75 | 6.12 | 6.35 | | 1.50 | 0.12 | 0.015 | 2.80 | 0 | 4.90 | 1.50 Mo |
| Y | 63.1 | 7.0 | 7.5 | 6.2 | 6.5 | | 0.15 | 0.05 | 0.004 | 3.00 | 0 | 5.00 | 1.50 Mo |

What is claimed is:

1. A homogenous superalloy weld composition, consisting of:
   about 2 to about 5 wt % Co;
   about 5 to about 15 wt % Cr;
   about 7 to 10 wt % Al;
   about 4 to about 6 wt % Ta;
   about 0.5 to about 1.5 wt % Si;
   about 0.1 to about 0.5 wt % Hf;
   up to about 0.05 wt % C;
   up to about 0.05 wt % B;
   about 1.0 to about 2.0 Re;
   about 3 to about 4.5 wt % W; and
   balance Ni and impurities.

2. The composition of claim 1, consisting of
   about 3 to about 3.5 wt % Co;
   about 7 to about 9 wt % Al;
   up to about 0.03 wt % C;
   up to about 0.03 wt % B.

3. The composition of claim 2, consisting of about 7 to about 8 wt % Cr.

4. The composition of claim 3, consisting of about 0.5 to about 0.65 wt % Si, about 0.1 to about 0.2 wt % Hf.

5. A homogenous superalloy weld composition, consisting of:
   about 3 to about 3.5 wt % Co;
   about 7 to about 8 wt % Cr;
   about 7 to about 9 wt % Al;
   about 4 to about 6 wt % Ta;
   about 0.5 to about 0.65 wt % Si;
   about 0.1 to about 0.2 wt % Hf;
   up to about 0.03 wt % C;
   up to about 0.03 wt % B;
   about 1.0 to about 2.0 Re;
   about 3 to about 4.5 wt % W; and
   balance Ni and impurities.

6. A repaired turbine engine component, said component including an in-tact region and a repaired region, said repaired region formed from a homogenous superalloy weld composition consisting of:
   about 3 to about 3.5 wt % Co;
   about 7 to about 8 wt % Cr:
   about 7 to about 9 wt % Al;
   about 4 to about 6 wt % Ta;
   about 0.5 to about 0.65 wt % Si;
   about 0.1 to about 0.2 wt % Hf;
   up to about 0.03 wt % C;
   up to about 0.03 wt % B;
   about 1.0 to about 2.0 Re;
   about 3 to about 4.5 wt % W; and
   balance Ni and impurities.

7. The component of claim 6, wherein the component is an airfoil, and the repaired region is a tip of the airfoil.

8. The component of claim 7, wherein the airfoil is a bucket of a power generation turbine engine.

9. The component of claim 8, wherein the airfoil is a blade of an aircraft turbine engine.

10. The component of claim 6, wherein the component is a turbine nozzle or a turbine vane.

11. The component of claim 10, wherein the repaired region is located along a leading edge region of the nozzle or vane.

* * * * *